United States Patent
Howell et al.

(10) Patent No.: US 7,865,618 B2
(45) Date of Patent: Jan. 4, 2011

(54) DEFEATING CACHE RESISTANT DOMAIN NAME SYSTEMS

(75) Inventors: Jonathan Ryan Howell, Seattle, WA (US); John R. Douceur, Bellevue, WA (US); Jeremy Eric Elson, Kirkland, WA (US)

(73) Assignee: Micorsoft Corporation, Redmond, WA (US)

( * ) Notice: Subject to any disclaimer, the term of this patent is extended or adjusted under 35 U.S.C. 154(b) by 344 days.

(21) Appl. No.: 12/035,652

(22) Filed: Feb. 22, 2008

(65) Prior Publication Data

US 2009/0216903 A1    Aug. 27, 2009

(51) Int. Cl.
G06F 15/16 (2006.01)
G06F 15/173 (2006.01)
G06F 15/177 (2006.01)
(52) U.S. Cl. .................. 709/245; 709/246; 709/223; 709/224; 709/227; 709/228
(58) Field of Classification Search ................. 709/245, 709/246, 217–228
See application file for complete search history.

(56) References Cited

U.S. PATENT DOCUMENTS

| | | | |
|---|---|---|---|
| 6,421,732 B1 | 7/2002 | Alkhatib et al. | |
| 6,446,133 B1 | 9/2002 | Tan et al. | |
| 6,681,017 B1 | 1/2004 | Matias et al. | |
| 6,701,329 B1 | 3/2004 | Esibov et al. | |
| 6,775,704 B1 | 8/2004 | Watson et al. | |
| 6,829,654 B1 | 12/2004 | Jungck | |
| 6,892,308 B1 | 5/2005 | Medvinsky | |
| 7,079,499 B1 | 7/2006 | Akhtar et al. | |
| 7,116,654 B2 | 10/2006 | Kim | |
| 7,240,100 B1 | 7/2007 | Wein et al. | |
| 7,251,694 B2 | 7/2007 | Gupta et al. | |
| 7,280,999 B2 | 10/2007 | Chung et al. | |
| 2003/0065763 A1 | 4/2003 | Swildens et al. | |
| 2004/0143579 A1 | 7/2004 | Nakazawa | |
| 2004/0215823 A1 | 10/2004 | Kleinfelter et al. | |
| 2005/0114653 A1* | 5/2005 | Sudia | 713/158 |
| 2005/0114680 A1 | 5/2005 | Chinnaswamy et al. | |
| 2005/0154837 A1 | 7/2005 | Keohane et al. | |
| 2005/0259645 A1 | 11/2005 | Chen et al. | |
| 2007/0078986 A1* | 4/2007 | Ethier et al. | 709/227 |
| 2007/0101412 A1 | 5/2007 | Yang et al. | |
| 2007/0283149 A1 | 12/2007 | Devarapalli | |
| 2008/0045214 A1 | 2/2008 | Wen et al. | |
| 2008/0082648 A1* | 4/2008 | Ahmed et al. | 709/223 |
| 2009/0007234 A1 | 1/2009 | Birger et al. | |
| 2009/0070474 A1* | 3/2009 | Aura et al. | 709/228 |
| 2009/0210526 A1* | 8/2009 | Howell et al. | 709/224 |

OTHER PUBLICATIONS

Edith Cohen, et al. Proactive Caching of DNS Records: Addressing a Performance Bottleneck http://www1.cs.columbia.edu/~danr/courses/6762/Summer03/week11/cacheDNS.pdf. Last accessed Nov. 8, 2007, 10 pages.

(Continued)

*Primary Examiner*—Haresh N Patel
(74) *Attorney, Agent, or Firm*—Turocy & Watson, LLP

(57) ABSTRACT

Domain name caching mechanisms are provided to address cache-defeating approaches. Domain name lookup requests are processed and cached information associated with a non-identical domain name returned in response. Cache-defeating behavior including nonce injection can be detected or inferred and employed to map domain name requests to previously cached information thereby exposing the benefits of caching.

19 Claims, 12 Drawing Sheets

OTHER PUBLICATIONS

Jaeyeon Jung, et al. DNS Performance and the Effectiveness of Caching http://www.cs.cmu.edu/~dga/15-744/S07/papers/dns-ton2002.pdf. Last accessed Nov. 12, 2007, 14 pages.

Jeffrey Pang, et al. On the Responsiveness of DNS based Network Control. IMC'04, Oct. 25-27, 2004, Taormina, Sicily, Italy. ACM 1-58113-821-0/04/0010 http://imconf.net/imc-2004/papers/p21-pang.pdf. Last accessed Nov. 12, 2007, 6 pages.

Parikshit Gopalan, et al. Caching with Expiration Times http://www.cc.gatech.edu/~mihail/www-papers/soda02.pdf. Last accessed Nov. 12, 2007, 8 pages.

Guiseppe Ateniese, et al. A New Approach to DNS Security (DNS-SEC), CCS'01, Nov. 5-8, 2001, Philadelphia, Pennsylvania, USA. ACM 1-58113-85-5/01/0011 http://www.eecs.umich.edu/~aprakash/eecs588/handouts/dnssec-ateniese.pdf. Lasts accessed Nov. 12, 2007, 10 pages.

Reza Curtmola, et al. On the Performance and Analysis of DNS Security Extensions, CANS 2005. http://www.cs.jhu.edu/~crix/publications/PerformanceAndAnalysisDNSSEC.pdf. Last accessed Nov. 12, 2007, 15 pages.

OA dated Jan. 6, 2010 for U.S. Appl. No. 12/031,105, 16 pages.

* cited by examiner

DEFEATING CACHE RESISTANT DOMAIN NAME SYSTEMS

CROSS-REFERENCE TO RELATED APPLICATIONS

The subject application is related to U.S. application Ser. No. 12/031,105, filed Feb. 14, 2008, and entitled DOMAIN NAME CACHE RESISTANCE, the entirety of which is incorporated herein by reference.

BACKGROUND

Domain names facilitate human interaction within the electronic world. A domain name is a combination of unique and memorable alphanumeric characters employed to identify or address one or more computers. Conventionally, domain names are a component of Uniform Resource Locators (URLs) associated with navigating the World Wide Web ("web") as well as a component of electronic mail ("email") addresses for sending and receiving electronic correspondence. In a URL, the domain name is the unique name ending with a top-level name such as "com" (e.g., "www.example.com", "example.com", "example.org" . . . ). In an email address, the domain name follows the "@" symbol (e.g., "example.com" in "jjones@example.com").

Electronic devices including computers and routers utilize Internet Protocol (IP) address rather than domain names for communication. IP addresses are unique numerical values that identify a specific location similar to the way a house address identifies a particular house on a street. In terms of format, the 32-bit values are often represented as doted decimal number to make it easy for humans to read including four octets separated by dots (e.g., 208.77.188.166). In addition to facilitating readability, the octets are used to help define classes of IP addresses for assignment to specific entities or purposes. Electronic devices employ such an addressing scheme to transmit data amongst one another across a network, for instance.

A domain name system or service (DNS) is employed to translate user entered domain names to computer comprehendible IP addresses. A DNS system is essentially a very large database system that maps domain names to IP addresses. Upon receipt of a domain name entered or designated by a user, an application such as a web browser can request the services of a DNS system. The DNS system acquires an IP address associated with a requested domain name and transmits it back to the requesting application. The IP address can subsequently be employed by the application to send or receive data. Overall, the DNS system provides a convenience to users by enabling use of memorable domain names rather than requiring utilization of forgettable IP addresses.

Accessing a DNS system for every electronic transmission is inefficient and over burdensome on the system itself. As a result, mappings between domain names and IP addresses are cached at various levels. For example, a client operating system or application and/or network host, among others, can save mapping information for later reference. By avoiding a DNS lookup, transactions are much faster especially considering the number of lookups that would otherwise be required.

Caching provides both favorable and unfavorable consequences. On one hand, caching expedites processing since once a mapping is retrieved an expensive acquisition transaction is not required. However, caching also reduces responsiveness to change. In some cases, domain name to IP address mappings change when a server fails or systems are scaled up or down, for instance. As a result, changes will not be available and systems will appear to stop working or work intermittently.

DNS protocol addresses this issue with a time-to-live (TTL) field or value. The TTL value, set by a domain publisher, for example, identifies an expiration time for a domain name/IP address mapping, ranging from seconds to weeks or longer. Upon expiration, the cached version is to be discarded, a DNS lookup performed, and the new mapping cached. The benefits of caching can therefore be balanced against responsiveness to change by selecting a reasonable TTL value.

Nevertheless, some Internet architecture components (e.g., intermediate DNS caches at Internet Service Providers, or client software) violate the DNS protocol by caching DNS records for periods beyond the specified expiration time.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to domain name caching in the presence of a cache defeating mechanism. Since TTL values are not always honored, stricter mechanisms can be developed to control or eliminate caching for the purpose of improving responsiveness to change. In particular, nonces or other unique identifiers can be injected within domain names and changed periodically to force propagation to an authoritative domain name server/service. The cost of limitation or elimination of caching is reduced efficiency as well as increased network and DNS server loads, among other things. Accordingly, systems and methods are disclosed to defeat cache-defeating mechanisms such as those that employ nonces.

In accordance with an aspect of this disclosure, a domain name caching system is provided that caches the result of a domain name lookup and serves the result to a lookup of a non-identical domain name. This enables different yet equivalent domain names to benefit from prior caching rather than being forced to perform an authoritative server lookup. More specifically, nonces or nonce patterns can be detected or inferred as a function of a variety of factors including but not limited to characteristics of a nonce protocol, the nonce itself, and/or a software implementation. Once a nonce recognition pattern as been established, it can be applied to convert new domain name requests into prior equivalent requests, exposing the caching benefit of the prior request.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to domain name caching are described in detail hereinafter. Mechanisms can be put in place that at least control and at most eliminate domain name caching. For example, nonces or nonce patterns can be added to domain names that remove benefits of caching by forcing propagation back to an authoritative server/service. To combat such cache-defeating mechanisms, approaches are provided that detect such behavior and reintroduce caching. Where caching is controlled via nonce-bearing domain names, for example, the nonces can be detected or inferred and results of a domain name lookup can be provided from a non-identical cached domain name.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
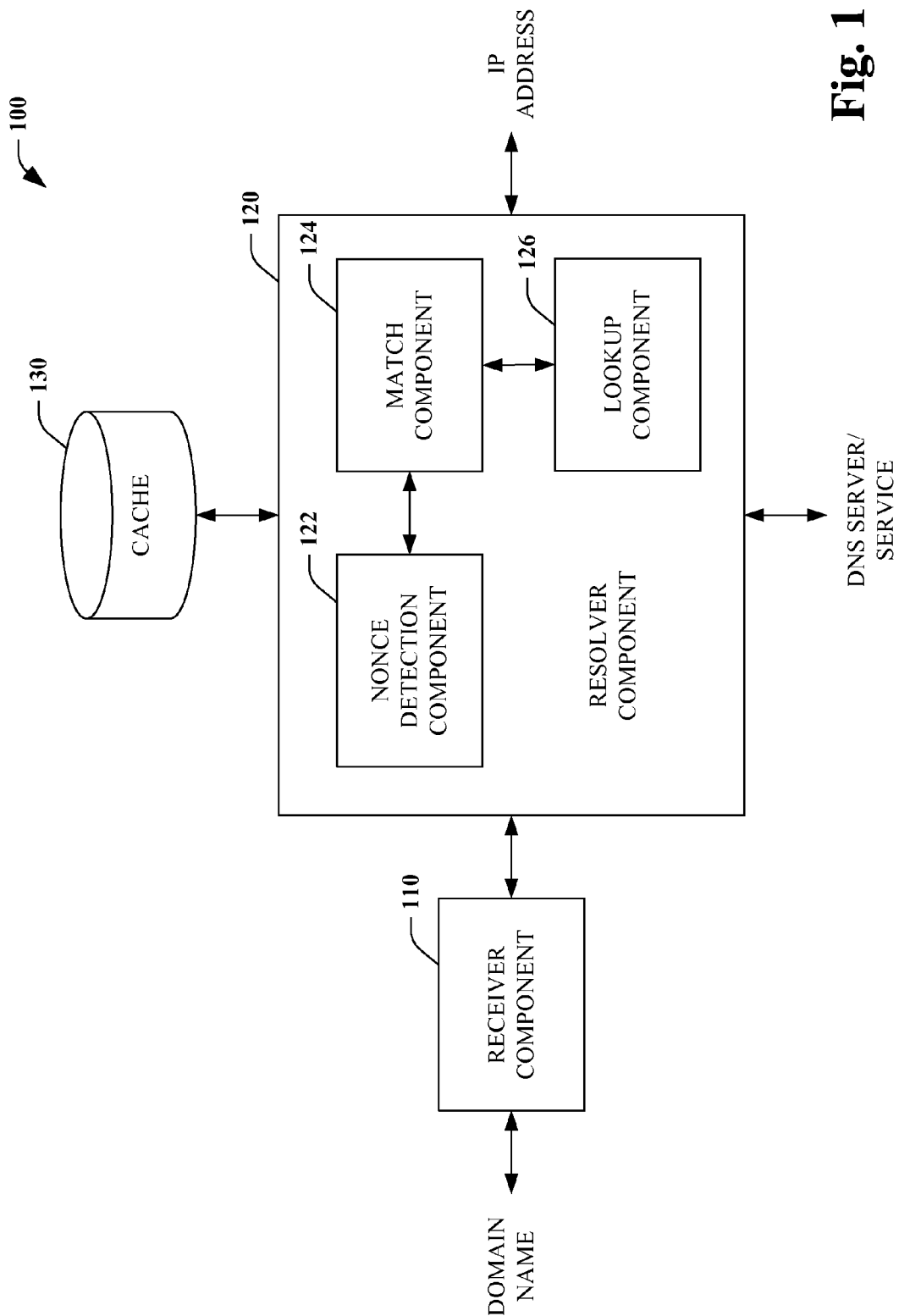
FIG. 1 is a block diagram of a domain name cache system in accordance with a disclosed aspect.

Referring initially to FIG. 1, a domain name cache system 100 is illustrated in accordance with an aspect of the claimed subject matter. The system 100 enables caching and employment of cached data even where cache-defeating mechanisms are in place. According to one particular embodiment, the system 100 can be employed to affect caching where it is being confounded by injection of nonces or nonce based patterns as described in the related application entitled DOMAIN NAME CACHE RESISTANCE and incorporated herein by reference. The claimed subject matter is not limited thereto. However, this detailed description will utilize this embodiment solely for purposes of clearly presenting aspects of the claimed subject matter.

In brief, since TTL (Time-To-Live) attributes alone are not respected, nonce-bearing domain names can employed to control DNS caching. A unique identifier can be generated and prepended to or otherwise included within a domain name to force propagation of a lookup to an authoritative server, since it is unlikely at least initially that the exact name has been cached. Control is affected as a function nonce-bearing name generation including the timing of generation. For example, if a new nonce is generated and added to every request, caching is completely eliminated. However, some caching of the nonce-bearing name can be allowed where generation of a new nonce is performed every few hours, days, etc. The more often lookup is performed at the authoritative server, the more responsive the system will be to change. Nevertheless, responsiveness comes at a cost of efficiency, among other things.

As shown, system 100 includes a receiver component 110, resolver component 120, and cache 130 (also a component as defined herein). The receiver component 110 receives, retrieves, or otherwise acquires a domain name as part of a lookup or domain resolution request. For example, the receiver component 110 can acquire the domain name from a local client application such as a web browser seeking an IP address of a web page. The receiver component 110 also transmits, provides, and/or makes this input available to resolver component 120. Stated differently, the receiver component 110 acts as an interface to the domain name cache system 100.

The resolver component 120 utilizes the domain name to look up and return data housed by the cache 130 and associated with the name, where available. Alternatively, the resolver component 120 can acquire the requested data elsewhere such as at an authoritative server, provide the data in response to a request, and cache the information for latter use. Similar to a conventional system, system 100 can acquire a domain name lookup request and utilize the exact domain name to locate and return a corresponding IP address from cache 130. Moreover, the system 100 can reintroduce caching where mechanisms are employed to limit or prevent it. In particular, the resolver component 120 can acquire and return data from non-identical domain names.

The resolver component 120 includes a nonce detection component 122, match component 124, and lookup component 126. The nonce detection component 122 can detect or otherwise identify the presence of a nonce in a domain name associated with a request and/or cache entry. For example, if a domain name corresponds to "12345.example.com," the nonce detection component 122 can determine that the domain name includes a nonce, namely "12345."

The match component 124 matches a request domain name with a cached domain name, where it exists. In the simplest case, the match component 124 matches identical domain names. Alternatively, the match component 124 can interact with the nonce detection component 122 to match non-identical yet equivalent names that vary by injections, such as nonces, intended to defeat caching. Continuing with the previous example, if the cache 130 includes an entry "56789.example.com" the match component 124 can match a request "12345.example.com" to that entry based on an indication from the nonce detection component 122 that the first five characters followed by a dot comprise a nonce or nonce pattern. Similarly, if the cache 130 includes "example.com" a request "12345.example.com can match that entry since it simply excludes a nonce.

Once a match is identified by the component 124, the lookup component 126 can lookup cached information associated with the domain name. In one instance, the lookup component 126 can identify a corresponding IP address. For example, the lookup component 126 can return "208.77.188.166" in response to a request "12345.example.com" where that IP address is cached for and associated with "56789.example.com."

Accordingly, a cache-defeating nonce based system can be defeated based in part on the ability to identify the presence of a nonce in a domain name. Once the nonce is identified, the system 100 can take action to ensure that cached data can be leveraged to improve overall system performance, for example by matching and returning data for non-identical domain names.

Figure 2:
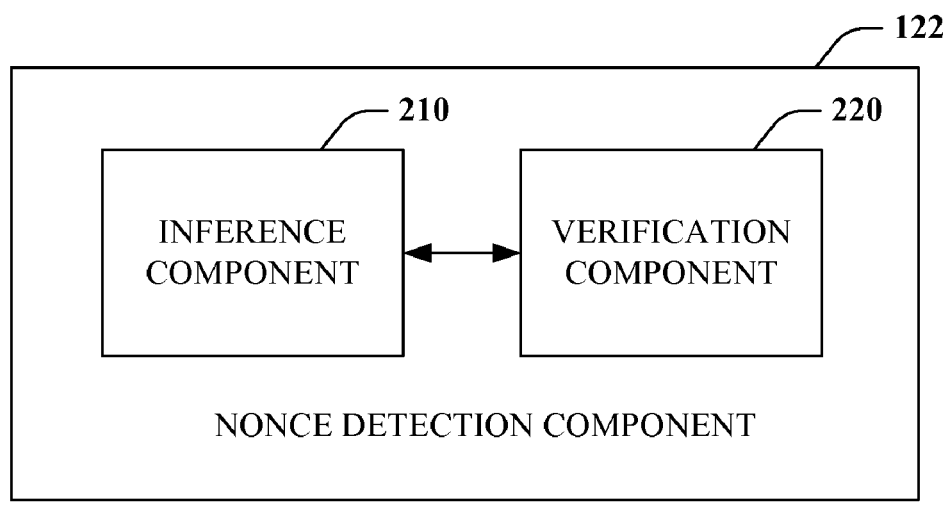
FIG. 2 is a block diagram of a representative nonce detection component according to an aspect of the disclosure.

FIG. 2 depicts a representative nonce detection component 122 according to claimed aspect. As previously disclosed, the nonce detection component 122 can identify a nonce or nonce pattern associated with or included within a domain name in an attempt to frustrate caching. The detection component 122 includes an inference component 210 that reasons about domain names as a function of available information in an attempt to identify nonces. A probability can be associated with portions of a domain name identified as a nonce or nonce pattern. For example, a portion of a domain name that corresponds to a well-known nonce pattern or signature will have a greater probability of being correctly identified than one that simply includes one or more characteristics of a nonce. To limit potential for error, only identifications above a threshold can be employed.

The nonce detection component 122 further includes a verification component 220 to establish or verify a nonce or nonce pattern. According to one exemplary embodiment, this can be accomplished by synthesizing requests including newer nonces based on patterns inferred from prior requests/queries or determined from known software behavior, amongst others. If such a request returns a successful result, and in particular if the result matches the results of recent "legitimate" client queries, the nonce detection component 122 can be confident in its assumption about the nonce portion of the query. This can be employed to further increase the probability of an inferred nonce or pattern. Further yet, this mechanism can be employed not only to verify a pattern, but also to initially identify one.

Figure 3:
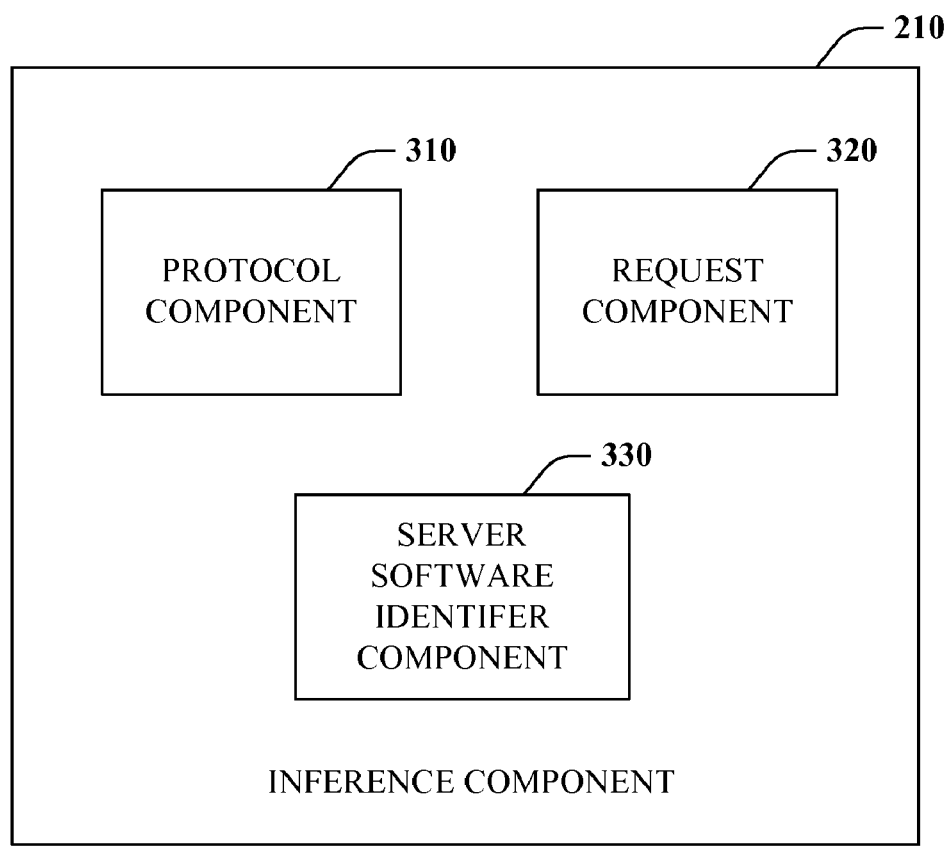
FIG. 3 is a block diagram of a representative inference component according to a disclosed aspect.

Turning to FIG. 3, a representative inference component 210 is illustrated in accordance with an aspect of the claimed subject matter. Nonces can be inferred or otherwise determined from a variety of factors, and the identification process can be specific to each factor. As depicted, the inference component 210 can include a protocol component 310.

As the name suggests, the protocol component 310 facilitates identification of a nonce as a function of a protocol or de-facto protocol. Generally, a protocol refers to standard or conventional manner of communication amongst computing end points. Among other things, a protocol defines the syntax of communication. Here, the protocol can refer to the syntax employed with respect to communication of domain names. The protocol component 310 can analyze communications and discover nonces with the help of known or inferred protocol patterns.

By way of example, a deployed nonce-based server can produce characteristic names such as "<nonce>.nonce.<domain>.com" (e.g., 12345.nonce.example.com"), to separate the nonce-structured part of the namespace from other administrator-defined names. In this case, the protocol component 310 can recognize the structure (e.g., nonce delimiter) and identify the actual nonce.

Figure 4:
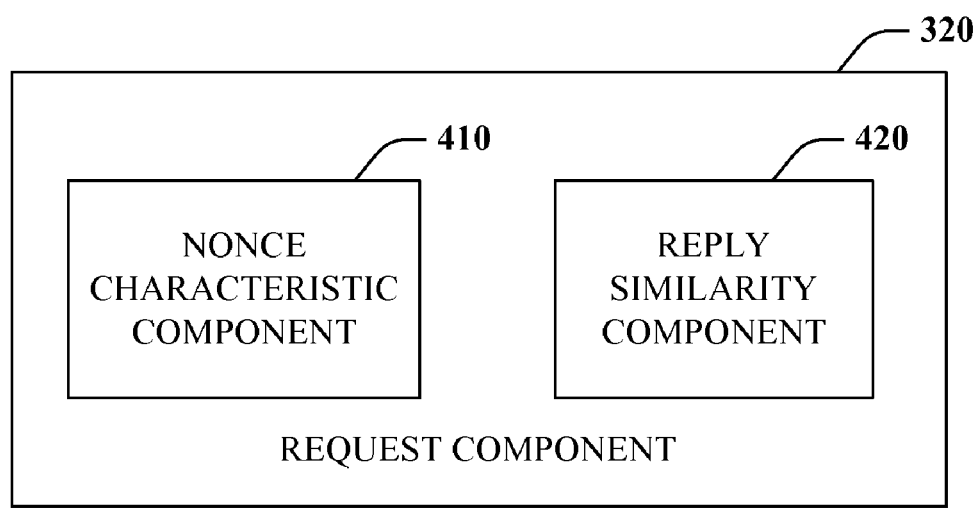
FIG. 4 is a block diagram of a representative request component that facilitates nonce identification in accordance with an aspect of the disclosure.

Additionally or alternatively, the inference component 210 can include a request component 320 that identifies a pattern of a group of names including a nonce by characteristics of requests or a request stream. Turning briefly to FIG. 4, a representative request component 320 is illustrated in further detail. As shown, the request component 320 can include a nonce characteristic component 410 and a reply similarity component 420.

The nonce characteristic component 410 facilitates identification of a nonce or pattern including a nonce as a function of common characteristics of the nonce itself. Even if a deployed service does not explicitly label its names, it may provide other telltale clues. For example, every nonce may always appear as an eight-digit hexadecimal number. Such characteristics can be determined or learned by the nonce characteristic component 410. Where a nonce characteristic or pattern is known or inferred, it can be employed by component 410 to determine which name patterns from a domain indicate the presence and position of a nonce.

The reply similarity component 420 enables identification of a nonce or pattern including a nonce by detecting identical or similar replies to requests. In other words, the reply similarity component 420 can analyze or observe a series of domain name server/service replies, for instance, and infer a pattern of nonce placement as a function thereof. For example, if a series of requests for names that differ only in one field all return the same results (or the results only change infrequently), the reply similarity component 420 can infer that the differing field is a nonce.

Returning to FIG. 3, the inference component 210 can also include server software identifier component 330 to infer a nonce or nonce pattern as a function of characteristics of a particular software implementation. The component 330 can use explicit or implicit properties of transactions with a DNS server, for instance, to determine which software implementation is being employed and use its knowledge of a software version to determine default or common nonce configurations. One implicit property can be that certain software versions will reply to unexpected nonce-configured address requests differently than if it replies to an unexpected request in other parts of its namespace.

It is to be appreciated that representative inference component 210 illustrates only a few exemplary mechanisms that can be employed to infer or otherwise determine the presence and/or position of a nonce or other unique identifier. Other mechanisms are also possible, contemplated, and within the spirit and scope of invention. Furthermore, it is to be noted that the components can be utilize alone or in various combinations with other inference sub-components.

Figure 5:
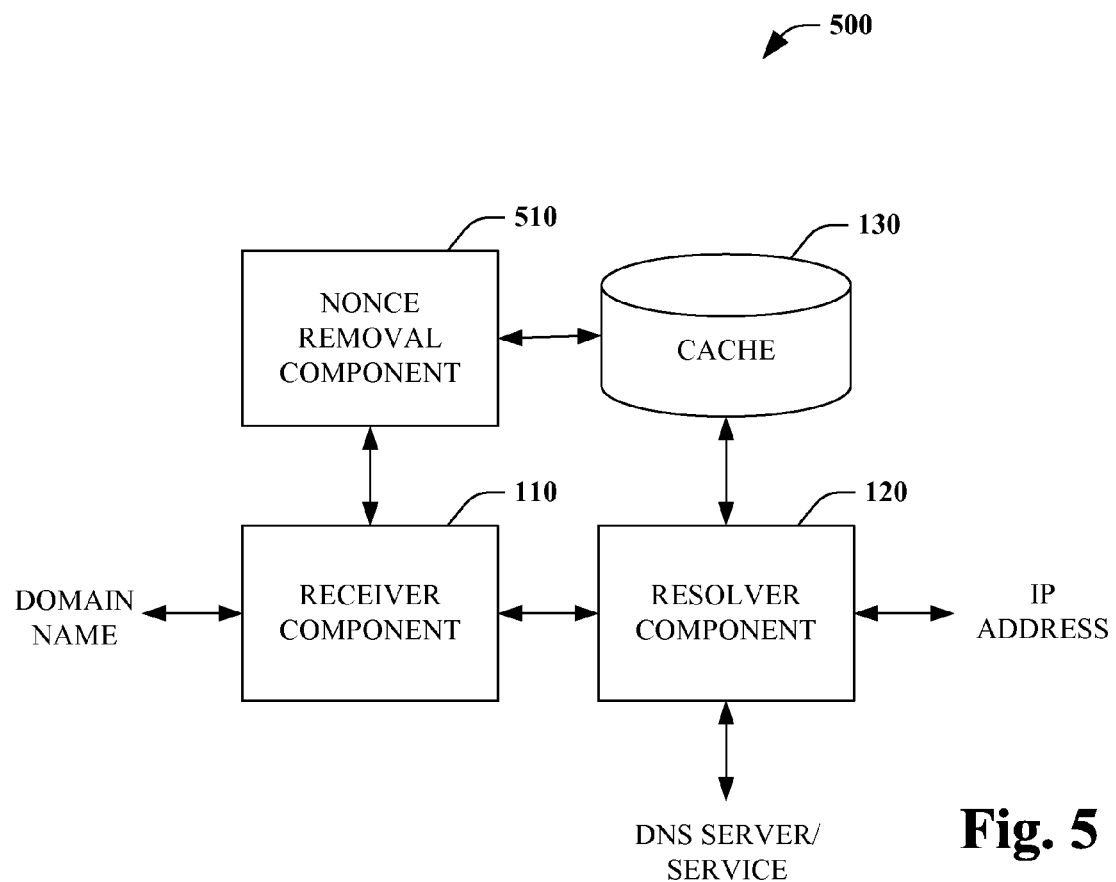
FIG. 5 is a block diagram of a domain name cache system that employs a nonce removal component according to an aspect of the disclosure.

Turning attention to FIG. 5, a domain name cache system 500 is illustrated according to an aspect of the claimed subject matter. As shown, the system 500 can include receiver component 110, resolver component 120, cache component 130, and nonce removal component 510. As previously described with respect system 100 of FIG. 1, the receiver component 110 can receive, retrieve, or otherwise acquire domain names as part of a request or query. The acquired domain name can subsequently be transmitted or made available to resolver component 120. Here, the resolver component 120 provides conventional functionality associated with acquiring and returning information located in cache 130 associated with a domain name such as, but not limited to, a corresponding IP address. Rather than necessitating a new resolver component 120 to deal with a cache defeating mechanism, this functionality can be provided by the nonce removal component 510. More specifically, functionality associated with the nonce detection component 220 of FIG. 1, amongst others, can be incorporated into nonce removal component 510. In this manner, any conventional caching system can be easily transformed to combat cache control and/or elimination mechanisms via injection of the nonce removal component 510.

As mentioned, the nonce removal component 510 can include functionality previously described with respect to nonce inference and detection. Upon identification of a nonce-bearing domain name, the component 510 can strip or remove the nonce thereby producing the original domain name. This can be performed upon initial receipt and caching of related information as well as lookup.

By way of example, suppose the cache 130 is empty and a domain name request is received for an IP address corresponding to "12345.example.com." The resolver component 120 can contact another server/service, perhaps an authoritative domain name service, to obtain the IP address. The nonce removal component 510 can remove the nonce "12345" producing "example.com", which can then be cached together with the acquired IP address. Upon receipt of a subsequent request such as "56789.example.com," the nonce "56789" can be stripped producing "example.com." The resolver can now match "example.com" with "example.com" and return the associated IP address. Here, the attempt to force propagation to an authoritative DNS server via use of a different nonce is foiled and the IP address can quickly be fetched and returned from the cache 130.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the nonce detection component 222 can utilize such mechanisms to infer and/or reason about the presence and/or position of nonces or nonce patterns.

In view of the exemplary systems described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
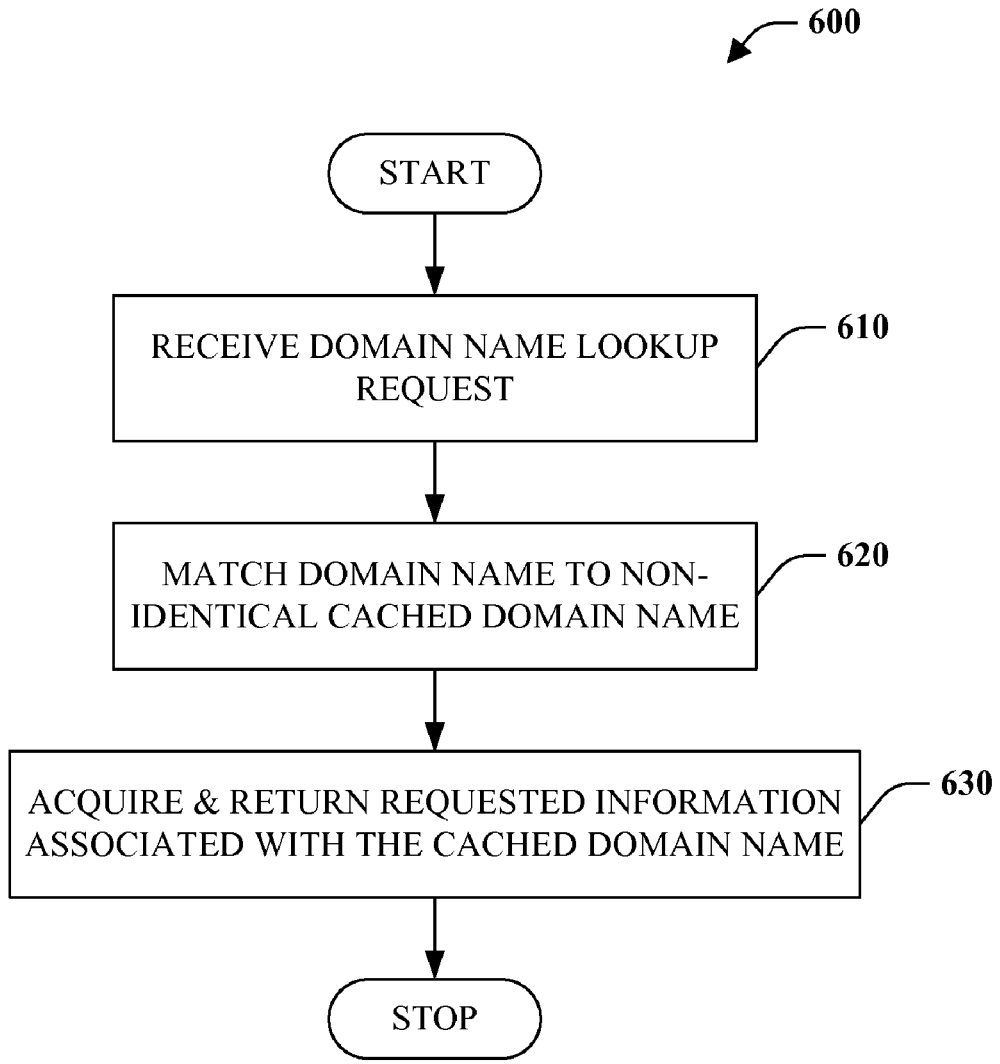
FIG. 6 is a flow chart diagram of a method of processing a domain name lookup in accordance with a disclosed aspect.

Referring to FIG. 6, a method of processing a domain name lookup 600 is depicted in accordance with an aspect of the claimed subject matter. At reference numeral 610, a domain name lookup request is received or otherwise acquired. For example, a client application such as a web browser or email program can request an IP address for a particular domain name.

At numeral 620, the received domain name is matched to a non-identical cached domain name. Conventionally, domain names are matched solely to identical domain names. Otherwise, there is no match at all. Here, however, it is recognized that various mechanisms may seek to control or eliminate caching by modifying a domain name periodically forcing a relatively expensive external lookup. Act 620 appreciates that different domain names can in fact be equivalent and return the same information and performs matching based thereon.

At reference 630, requested information associated with a matching domain name is acquired from cache and returned. In the case where the requester is a web browser or email program, the IP address corresponding to a provided domain name can be returned.

Figure 7:
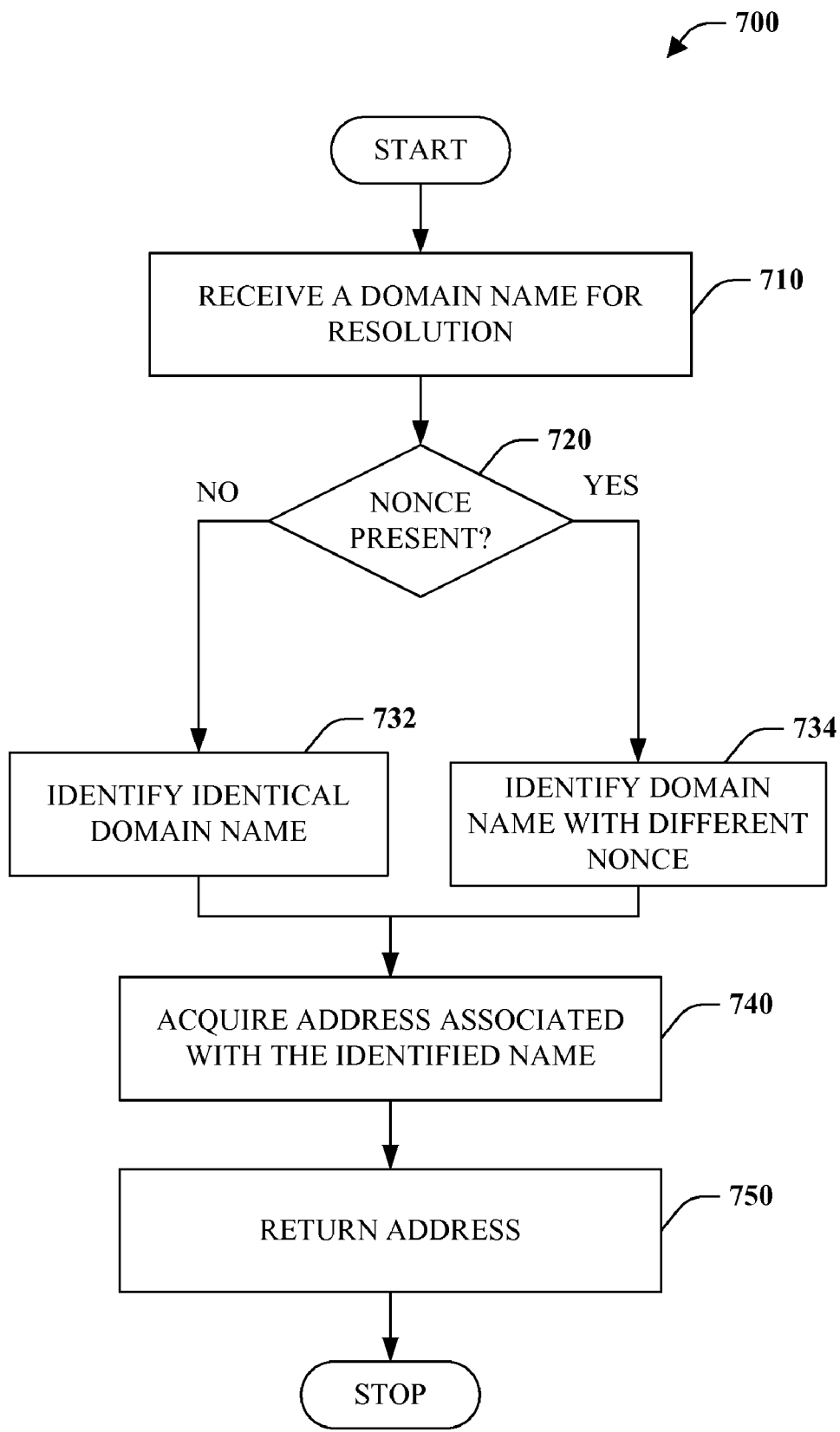
FIG. 7 is a flow chart diagram of a method of processing a domain name lookup in the presence a nonce according to an aspect of the disclosure.

FIG. 7 is a flow chart diagram of a method 700 of processing a domain name request in the presence of a nonce according to an aspect of the claimed subject matter. At reference numeral 710, a domain name is received for resolution. For example, a corresponding IP address can be sought to facilitate information retrieval. At numeral 720, a determination is made as to whether a nonce is present. This determination can be made as a function of one or more factors including, but not limited to, characteristics of a nonce protocol, the nonce itself, or a software implementation as well as similarity of replies to requests. If it is determined, at 720, that the domain name is not nonce bearing ("NO"), the method continues at 732 where, assuming its presence, an identical domain name is identified in the cache. If, alternatively, a nonce is detected at 720 ("YES"), a different domain name is identified. In this case, the different name can be non-identical yet equivalent. For example, an equivalent domain name can vary solely by a prepended nonce. Regardless of path, the method proceeds to reference numeral 740 and 750, where the address corresponding to the identified name is acquired from cache and returned, respectively.

By way of example, suppose the received domain name corresponds to "99AB1.example.com" at numeral 710. At reference 720, a nonce is detected as a function of acquired or inferred knowledge that a nonce is a five digit hexadecimal number. An equivalent domain name housed in cache can be identified such as "01DF9.example.com," since the domain name varies only by a five-digit nonce. Subsequently, an IP address, such as "208.77.188.166," linked to the equivalent domain name can be acquired from cache and returned to a requesting entity.

Figure 8:
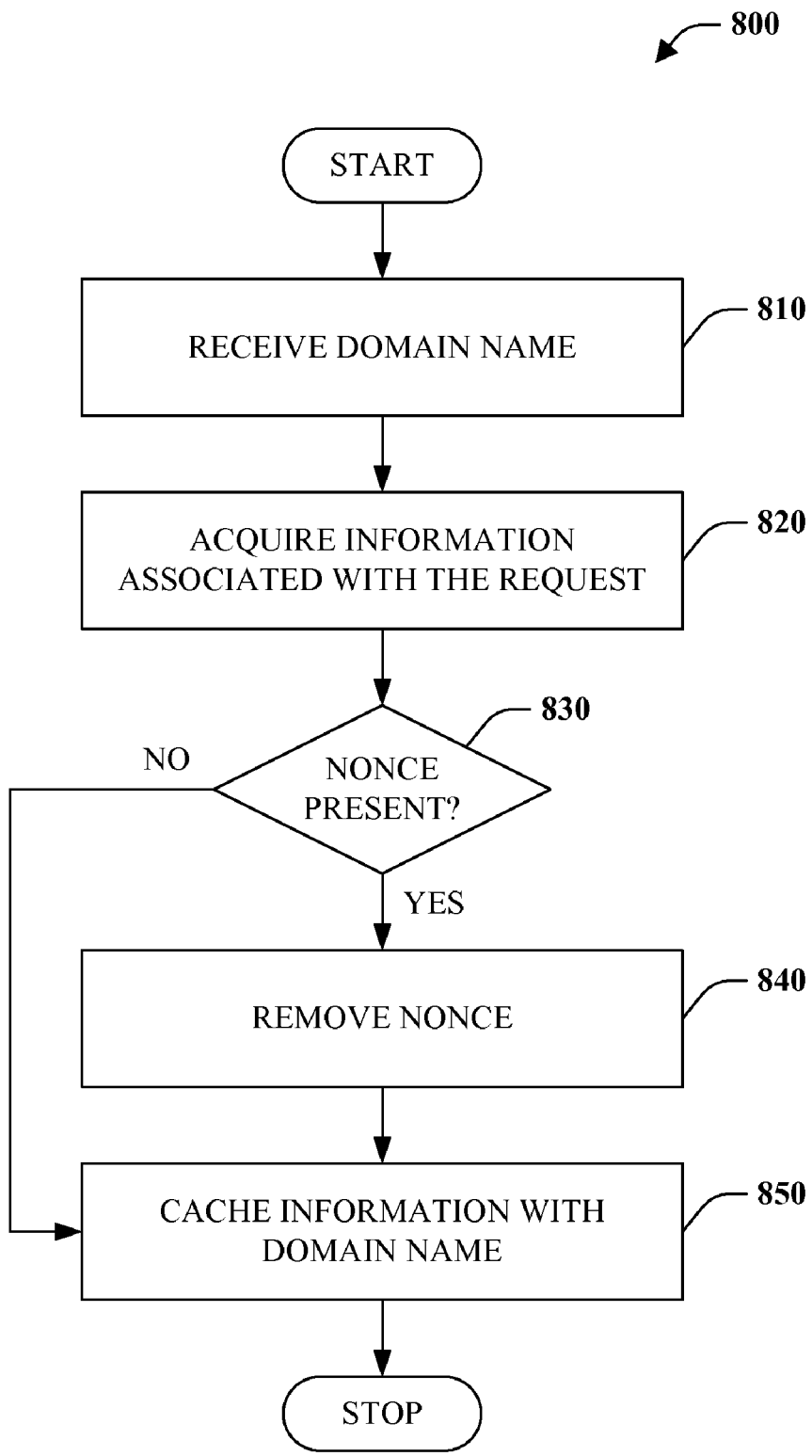
FIG. 8 is a flow chart diagram of a domain name caching method according to an aspect of the disclosure.

FIG. 8 depicts a domain name caching method 800 according to an aspect of the claimed subject matter. At reference numeral 810, a domain name is received perhaps associated with a resolution request. At numeral 820, information associated with the domain name is acquired. For instance, a series of requests can be performed ending with an authoritative domain name server providing a corresponding IP address. At reference 820, a determination is made as to whether a nonce is present within the received domain name. Such a determination can be made as a function of characteristics of a nonce protocol, the nonce itself, or a software implementation as well as similarity of replies to requests, among other things. If a nonce is not present at numeral 830 ("NO"), the method continues at reference numeral 850 where acquired information is cached for the received domain name. Alternately, if a nonce is determined to be present at 830 ("YES"), the method proceeds to reference numeral 840 where the identified nonce is removed. Subsequently, the method continues at 850 where acquired information is cached for the non-nonce bearing domain name.

Figure 9:
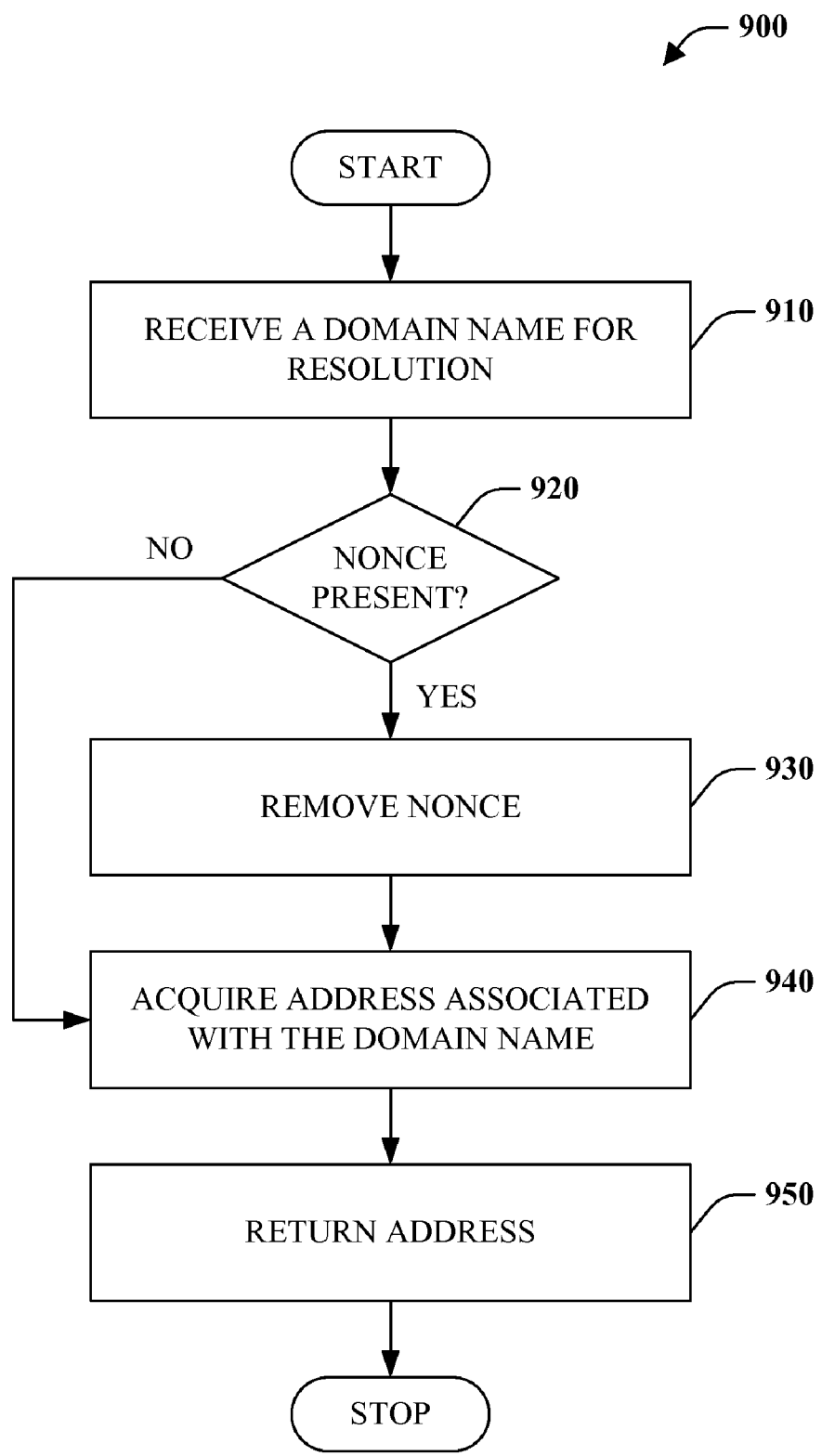
FIG. 9 is a flow chart diagram of a domain name resolution method in accordance with a disclosed aspect.

Referring to FIG. 9, a domain name resolution method 900 is illustrated according to an aspect of the claimed subject matter. At reference numeral 910, a domain name is received for IP address resolution. At numeral 920, a determination is made concerning whether or not a nonce is present within the received domain name. The determination or inference can be made based on characteristics of a nonce protocol, the nonce itself, or a software implementation as well as similarity of replies to requests, among other things. For example, if the domain name corresponds to a well-known pattern including a nonce, a nonce can be deemed present. If a nonce is not present ("NO"), the method can continue to acquire the corresponding domain IP address from cache (assuming it is available) and return it at numerals 940 and 950, respectively. However, if, at 920, a nonce is determined to be present ("YES") the method first proceeds to reference numeral 930 where the nonce is removed. Subsequently, the method can continue at 940 where an address associated with the domain name is acquired from cache (assuming it is available) and returned to a requesting entity at numeral 950. Accordingly, caches can include only non-nonce bearing names and nonce-bearing requests can be stripped of their nonces to facilitate identical matching.

Figure 10:
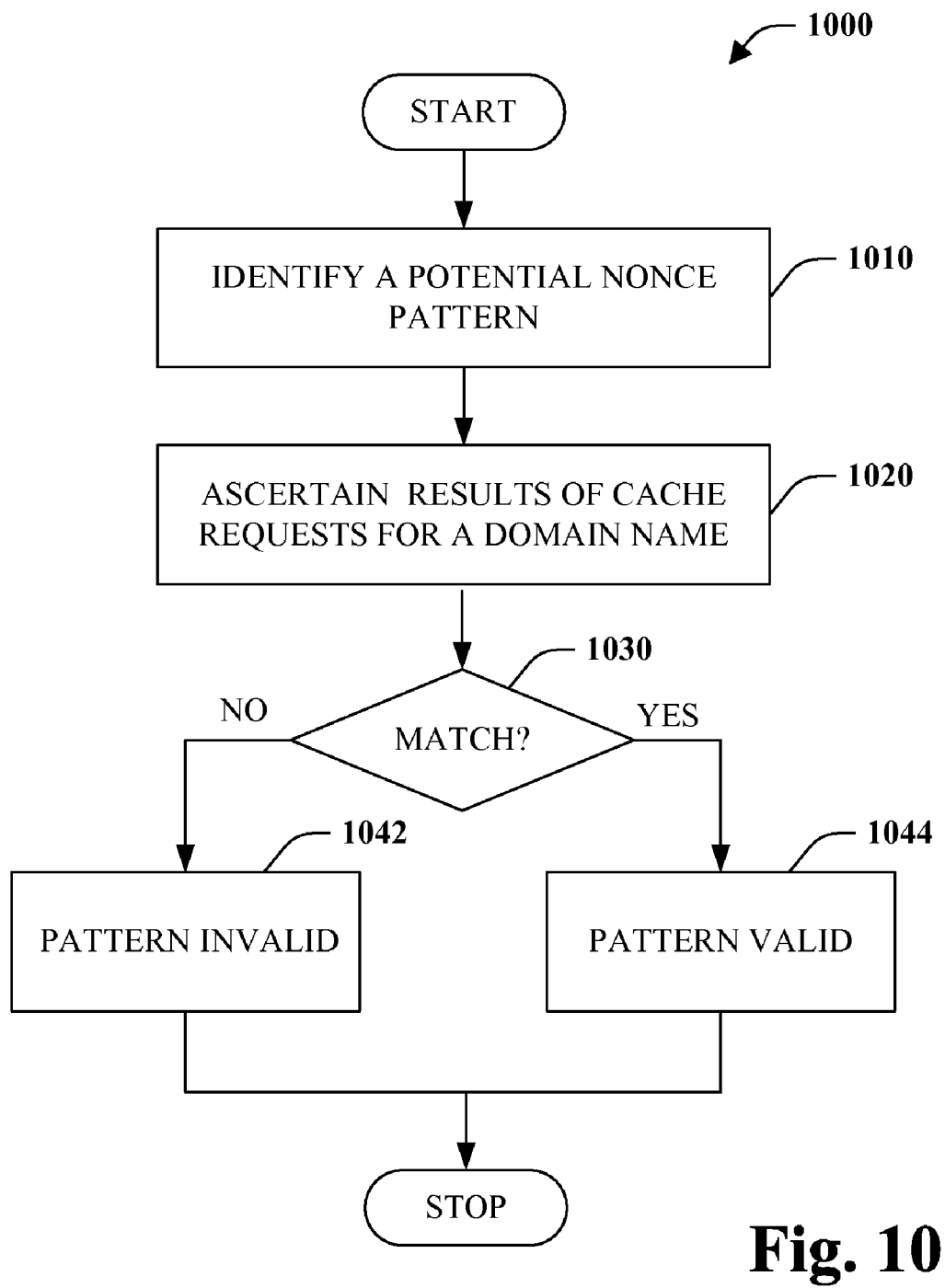
FIG. 10 is a flow chart diagram of a nonce pattern verification method according to an aspect of the subject disclosure.

FIG. 10 illustrates a nonce pattern verification method 1000 according to an aspect of the subject matter. At reference numeral 1010, a potential nonce pattern including a new nonce is identified that is associated with a number of other requests. In one instance, this pattern can be inferred as a function of a variety of factors including but not limited to characteristics of a nonce protocol, characteristics of the nonce itself, and/or characteristics of a software implementation. At numeral 1020, the results of cache requests for a domain name are ascertained. A determination is made at numeral 1030 as to whether the results of the pattern including the new nonce match results of prior client requests. If no, the method continues at 1042 where an indication is made that the pattern may be invalid due to differing results. If yes, the method proceeds to 1044 where an indication is made that the potential pattern is valid. Once a pattern is verified or validated, the pattern can be used to map fresh queries into equivalent prior queries.

It is to be noted that the nonce pattern method 1000 need not be employed solely with respect to verification. The same or similar method can be employed to identify patterns in the first place. For example, based on similar results a pattern can be inferred.

The term "nonce" as used herein is intended to refer to a unique identifier. As used in security engineering, the word "nonce" stands for number used once. However, "nonce" need not be limited to a number. It can comprise numbers, symbols, and/or characters, among other things. The term "nonce" may also be referred to as a serial number, sequence number, uniquifier, or a distinguisher consistent with the above definition. A nonce may also refer to a label used more than once.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
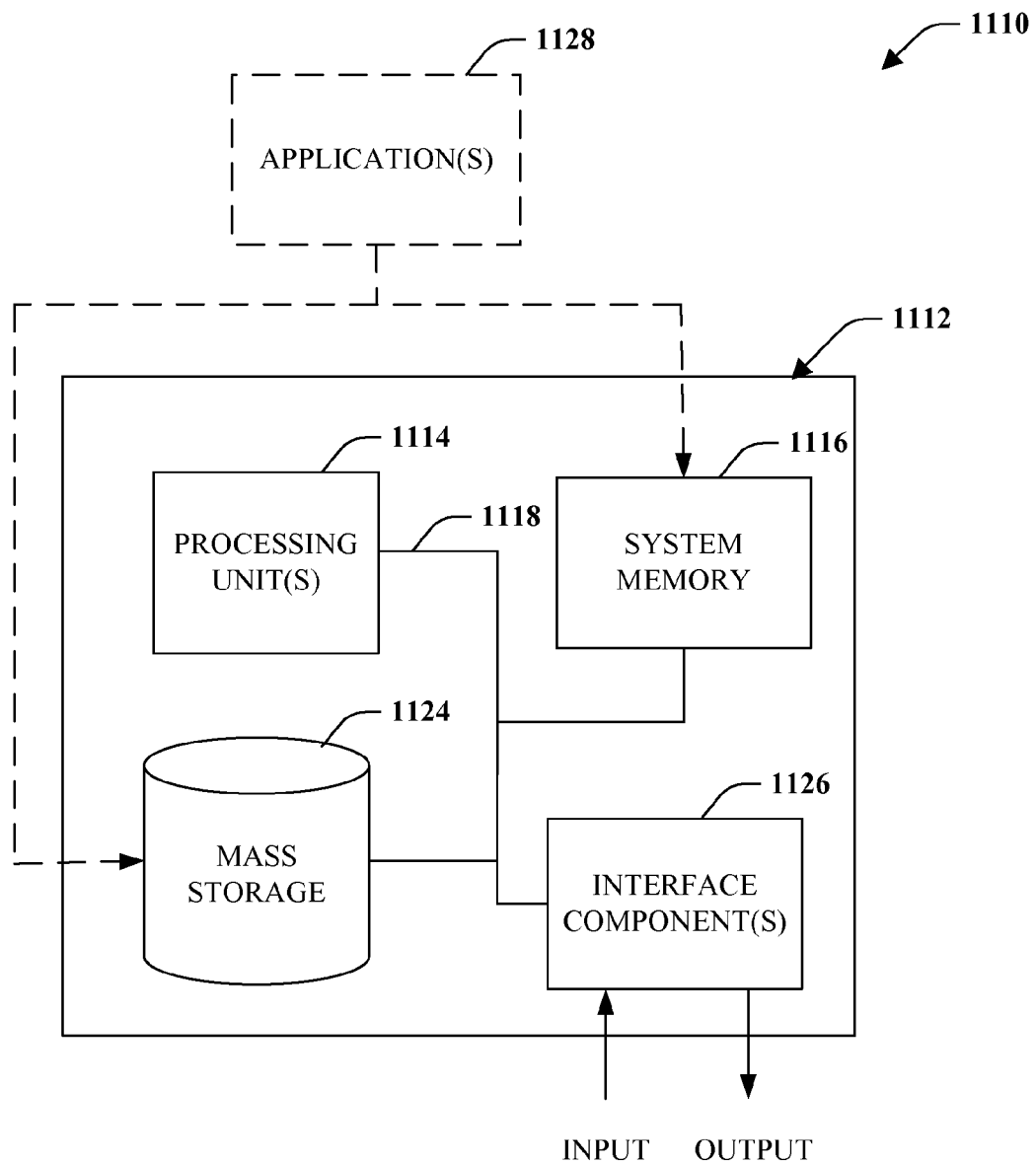
FIG. 11 is a schematic block diagram illustrating a suitable operating environment for aspects of the subject disclosure.
Figure 12:
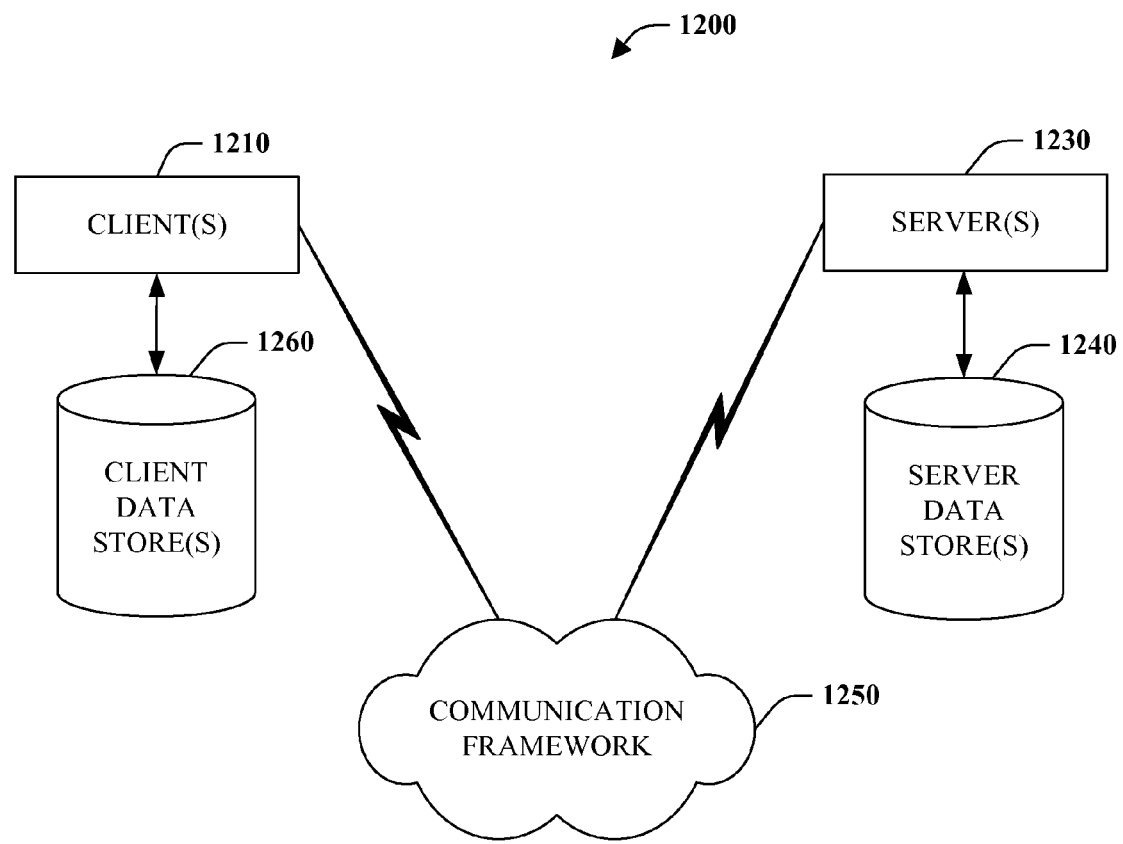
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g. CRT, LCD, plasma . . . ), speakers, printers and other computers, among other things.

FIG. 12 is a schematic block diagram of a sample computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. By way of example and not limitation, the domain name system that thwarts efforts of cache-defeating mechanisms can be provided by a server 1230. A client 1210 seeking domain name resolution can communicate with the server based domain name system across the communication framework 1250. In one embodiment, the server 1230 can be a proxy or Internet service provider server that caches domain name records for a plurality of machines. Furthermore, the nonce removal component 510 can be distributed by a server 1230 to one or more clients 1210 across the communication framework 1250 to enable conventional domain name caching systems to be hardened against cache control and/or elimination mechanism.

Still further yet, these cache-defeating mechanisms can utilize client/server interactions. For example, a client 1210 can generate a nonce bearing address and provide it to a domain name server 1230 for resolution, bypassing caching layers. In another instance, a server 1230 can produce and inject nonces in web pages returned to requesting clients 1210. Still further, a first server 1230 can generate addresses directing requests from clients 1210 to a second server 1230 for generation of a nonce-bearing domain name.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A domain name caching system, comprising:
  a processor;
  and a memory component communicatively coupled to the processor, the memory component having stored therein computer-executable instructions that when executed by the processor cause the processor to implement:
    a receiver component configured to receive a domain name lookup request, wherein the domain lookup request includes a nonce;

a nonce removal component configured to remove the nonce from the domain name lookup request;

a resolver component configured to return information from a cache in response to the domain name lookup request without the nonce; and an inference component configured to facilitate ascertaining a location of the nonce based on characteristics of a nonce protocol.

2. The system of claim 1, wherein the domain name lookup request includes a nonce pattern.

3. The system of claim 2, wherein the nonce removal component is configured to remove the nonce pattern from the domain name lookup request.

4. The system of claim 1, wherein the inference component is configured to infer at least one of a presence or a position of the nonce.

5. The system of claim 4, further comprising a request component configured to facilitate ascertaining a location of the nonce as a function of characteristics of a request stream.

6. The system of claim 5, wherein the request component is configured to analyze a similarity of results of a variety of requests.

7. The system of claim 4, wherein the inference component is configured to facilitate ascertaining a location of the nonce as a function of characteristics of a domain name server software.

8. The system of claim 1, further comprising a verification component configured to verify that requests with new nonces return results consistent with prior requests to validate nonce inferences.

9. A domain name caching method, comprising:

employing a processor to execute computer executable instructions stored on a computer readable storage medium to implement the following acts:

receiving a domain name, wherein the domain name includes a nonce;

removing the nonce from the domain name;

returning a cached IP address associated with the domain name without the nonce; and ascertaining a location of the nonce based on characteristics of a nonce protocol.

10. The method of claim 9, further comprising detecting a domain name pattern including the nonce.

11. The method of claim 10, comprising detecting the domain name pattern as a function of characteristics of a nonce-protocol.

12. The method of claim 10, comprising detecting the domain name pattern as a function of known name patterns.

13. The method of claim 10, comprising detecting the domain name pattern as a function of characteristics of a request stream.

14. The method of claim 10, comprising detecting the domain name pattern as a function of common nonce characteristics.

15. The method of claim 10, comprising detecting the domain name pattern based on identical or similar replies to a variety of requests.

16. The method of claim 10, comprising detecting the domain name pattern as a function of characteristics of a known software implementation.

17. The method of claim 10, further comprising verifying the domain name pattern by synthesizing requests with new nonces, and verifying that the replies are consistent with results of prior client requests.

18. A domain name caching system, comprising:

means for caching a result of an initial domain name lookup;

means for receiving a subsequent domain name lookup, wherein the subsequent domain name lookup includes a nonce;

means for removing the nonce from the subsequent domain name lookup;

means for serving the result in response to associating the subsequent domain name lookup with the initial domain name; and means for ascertaining a location of the nonce based on characteristics of a nonce protocol.

19. The system of claim 18, further comprising a means for detecting a domain name pattern to facilitate an identification of equivalent domain names.

* * * * *